(12) United States Patent (10) Patent No.: US 7,731,466 B2
Shea et al. (45) Date of Patent: Jun. 8, 2010

(54) THREAD PROFILE MODIFICATION FOR CONTROLLED STIFFNESS

(75) Inventors: David H. Shea, Lake Orion, MI (US); Brian K Bartnick, Ortonville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 129 days.

(21) Appl. No.: 11/934,471

(22) Filed: Nov. 2, 2007

(65) Prior Publication Data

US 2009/0116929 A1 May 7, 2009

(51) Int. Cl.
*F16B 33/00* (2006.01)
(52) U.S. Cl. .................. 411/366.3; 411/308; 411/411
(58) Field of Classification Search .............. 403/28, 403/286, 337; 411/366.1, 263, 307–312, 411/333, 334, 366.3, 411
See application file for complete search history.

(56) References Cited

U.S. PATENT DOCUMENTS

| | | | |
|---|---|---|---|
| 1,369,156 A * | 2/1921 | Woodward | 411/307 |
| 2,788,046 A * | 4/1957 | Rosan | 411/311 |
| 3,323,402 A * | 6/1967 | Gowen, Jr. et al. | 411/411 |
| 3,394,626 A * | 7/1968 | Oliver | 411/411 |
| 3,426,820 A * | 2/1969 | Phipard, Jr. | 411/310 |
| 4,850,775 A * | 7/1989 | Lee et al. | 411/366.3 |
| 5,624,219 A * | 4/1997 | Hamanaka | 411/308 |
| 6,216,510 B1 * | 4/2001 | Hashimoto | 72/103 |
| 6,394,726 B1 * | 5/2002 | Garvick | 411/414 |

* cited by examiner

*Primary Examiner*—Gary Estremsky
(74) *Attorney, Agent, or Firm*—Harness, Dickey & Pierce, P.L.C.

(57) ABSTRACT

The thread form can provide a controlled thread stiffness which can more evenly distribute loads and can be less sensitive to changes in relative pitch. The controlled stiffness of the thread can provide a desired cantilever bending of the thread under assembled load. The thread form can utilize a traditional thread form at and/or above the pitch diameter, thereby maintaining the area of contact close to that of a standard thread form. Standard gaging implements can be used to ascertain the thread pitch and for quality control. The thread form includes a side extending between the crest and the root. The side has a first portion extending from the crest toward the root and the second portion extending from the first portion toward the root. The first and second portions extend toward the root in different orientations relative to the thread.

15 Claims, 10 Drawing Sheets

THREAD PROFILE MODIFICATION FOR CONTROLLED STIFFNESS

FIELD

The present disclosure relates to threaded fasteners and, more particularly, to a thread pattern for improved clamp load retention of a bolted joint.

BACKGROUND

The statements in this section merely provide background information related to the present teachings and may not constitute prior art.

Threaded fasteners, such as bolts, are used to join components together. The bolt can be used in conjunction with a nut or an internal threaded bore in one of the components to retain the components together. The exterior surface of the bolt and interior surface of the nut or the bore (hereinafter threaded member) include complementary threads that contact axially as the bolt is inserted into the threaded member and rotated. The purpose of the bolt and the threaded member are to create and retain axial load throughout the service life of the components being joined together. The bolt and the threaded member thereby impart a clamping load on the components. If the bolt and the threaded member do not retain a minimum axial load (clamp load) a highly loaded joint will fail.

In conventional bolted joint design, nominally perfect internal and external threads of a bolt and its threaded member contact axially as the bolt is inserted into the threaded member and rotated relative to the threaded member. However, normal deflection of the bolt threads as tightening loads are applied locally changes the thread pitch which can result in uneven distribution of the load. This uneven distribution loads the top or first thread of the bolt most heavily when the bolt is tightened. These localized changes in bolt pitch can result in stress concentrations and plastic yield that increase susceptibility to load loss under service due to yield and creep. The yielding and creeping can be more pronounced when one of the threads, such as the internal threads, are weaker.

In highly stressed joints, such as a cylinder head or a crankshaft bearing journal cap, the goal is to maximize tension in the bolt. To achieve this, bolt tightening strategies are designed to tighten the bolt to a point that the bolt yields plastically. As the bolt is taken to such high levels of tension, the threaded member sees very high shear loads, ultimately to the point of the threads of the threaded member yielding, starting in most cases with the most highly loaded top thread as discussed above. When the threads of the threaded member are at or near yield, they are susceptible to creep and further yield due to service loads. Yield and creep are both contributors to load loss and ultimate joint failure. Therefore, to improve the clamp load retention of a joint, it is desirable to reduce the sensitivity to changes in the relative pitch that occur between the bolt and the threaded member that cause uneven load distribution.

Additionally, the current standard thread form or pattern is optimized for applications where steel bolts are engaging steel internal threads. However, current applications can call for the use of steel bolts into weaker materials, such as aluminum or other materials. These different materials have different properties, such as different thread stiffness, which can cause the stiffer threads to unevenly distribute loads on the less stiff threads. Moreover, the different materials can have different coefficients of thermal expansion. As a result, the bolt and threaded member can have different growths for the same temperature. The different growths can change the relative pitch of the bolt and threaded member as they grow and can change the initial distribution of loads and can promote uneven distribution of the load. The different growths can also cause stress concentrations and plastic yield that can increase susceptibility to load loss under service. Furthermore, the location of the bolt and threaded member relative to a heat source can also effect their growth relative to one another over time. For example, the component closer to the source of thermal heat may experience a temperature increase prior to the other component, thereby causing the first component to begin expanding prior to the second component expanding. This temporal aspect of temperature change can be exacerbated by the use of different materials having different coefficients of thermal expansion. Therefore, it is desirable to reduce the sensitivity of the load distribution to changes in the dimensions of the bolt and the threaded member.

Accordingly, it would be desirable to develop a new thread form or pattern that addresses the above desires and concerns. Furthermore, in some applications it would be desirable if the new thread form were able to substantially maintain the core axial stiffness (minor diameter) of the bolt thereby avoiding increased variation in the relative pitch during assembly. Furthermore, it would be desirable if the new thread form could maintain a sufficient contact area between the internal and external threads to prevent compressive yield on the sides (also known as flanks) of the weaker threads. Additionally, it would be advantageous to maintain the ability to manufacture such a thread form with standard manufacturing techniques, such as standard roll forming. Moreover, it would be desirable if the thread form maintained the ability to gage the thread form using existing gages for quality control without causing an increase in cost to make new gages for the new thread form. It would be further advantageous if the new thread form could be used in conjunction with an existing typical prior art thread form, thereby facilitating retrofitting with the new thread form.

SUMMARY

To address these desires, the inventors have developed a new approach to bolt design using deviations from the typical 60° thread forms commonly in use. This approach breaks the normal coupling between bolt and thread stiffness inherent in a fixed 60° thread form bolt design. The new thread form can reduce the sensitivity to changes in the relative pitch that occur between a bolt and the threaded member that cause uneven load distribution. The thread form can provide a controlled thread stiffness which can more evenly distribute loads and can be less sensitive to changes in relative pitch. The thread form is especially applicable to applications of bolts and threaded members of different materials, such as a steel bolt and an aluminum threaded member. The thread form can reduce the stiffness of the thread from that of a standard thread form and can be used to more uniformly distribute loads into the weaker threads.

In some applications, the improved thread form can substantially maintain the core stiffness by substantially maintaining the minor diameter, which can avoid increased variation in relative pitch during assembly. In other applications, the core stiffness can be reduced while still achieving a reduction in the bending stiffness of the threads of the thread form, depending on the loading in a given application.

The controlled stiffness of the thread in the new thread form can provide a desired cantilever bending of the thread under assembled loads. The thread form can utilize a traditional thread form at and/or above the pitch diameter thereby keeping the area of contact close to that of a standard thread form. The slight change to the contact area and the location of contact can advantageously help bending of the thread form in that the load is applied further away from the root of the thread. The thread form can maintain desired root radii, thereby achieving a desired fatigue resistance. The thread form may be able to use standard gaging for ascertaining the thread pitch diameter and for quality control purposes. The new thread form can mate with existing typical prior art thread forms, thereby facilitating retrofitting with the new thread form.

A thread form according to the present teachings includes a helically extending thread, a crest, a root, and a side extending between the crest and the root. The side has a first portion extending from the crest toward the root and a second portion extending from the first portion toward the root. The first and second portions extend toward the root in different orientations relative to the thread. The thread form can be on a bolt that extends through a first aperture in a first member and that extends at least partially into a second aperture in a second member. The bolt can axially load the first and second members and retain the first and second members together.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

Figure 1:
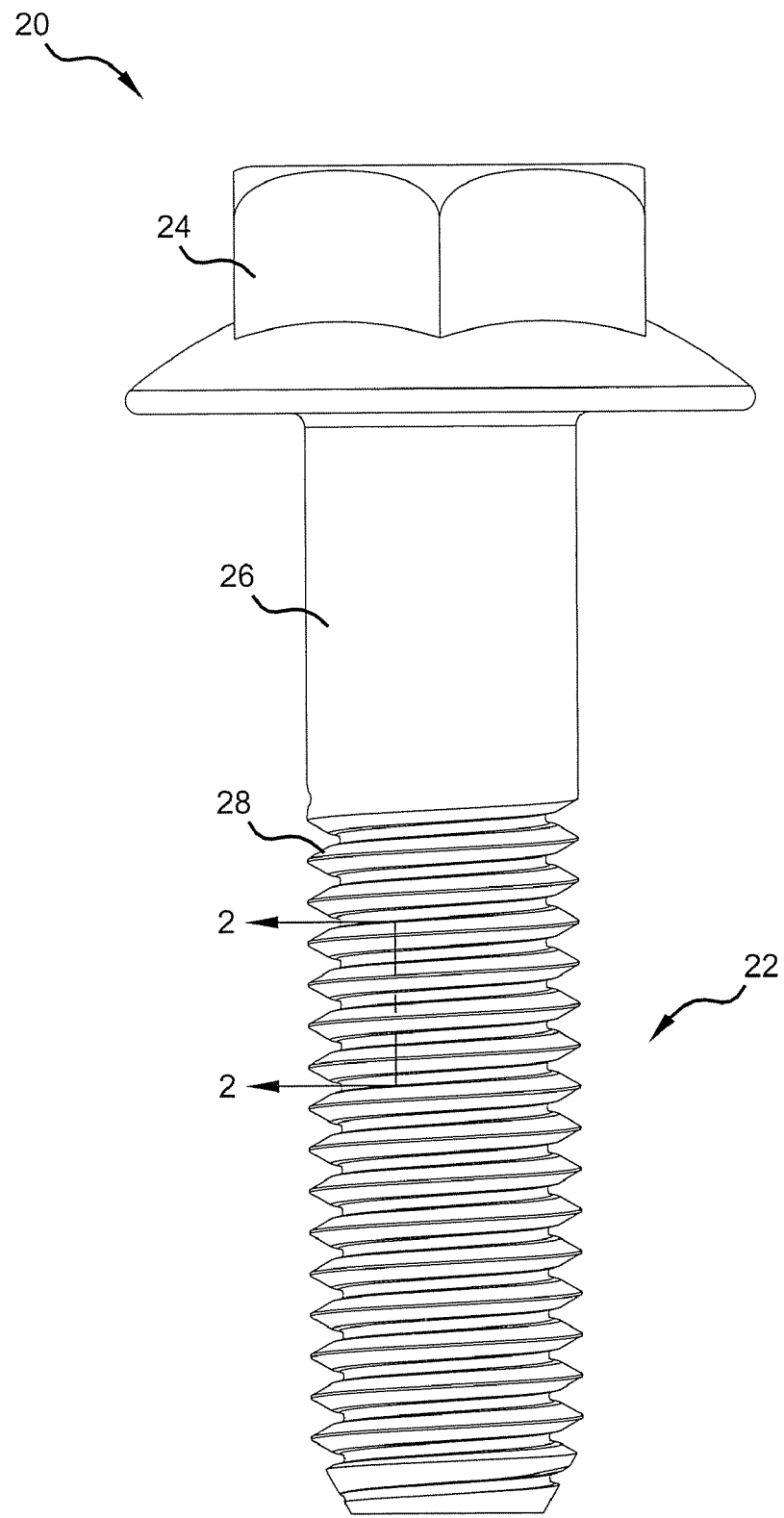
FIG. 1 is an elevation view of a bolt having a thread form according to a first embodiment of the present teachings.

The following description is merely exemplary in nature and is not intended to limit the present disclosure, application, or uses. It should be understood that throughout the drawings, corresponding reference numerals indicate like or corresponding parts and features (e.g., 22,122, 222, etc.).

A bolt 20 having a thread form or pattern 22 according to the present teachings is shown in FIG. 1. Bolt 20 includes a head 24 and a shank 26 between head 24 and thread form 22. It should be appreciated, however, that thread form 22 can extend all the way up to head 24.

Figure 2:
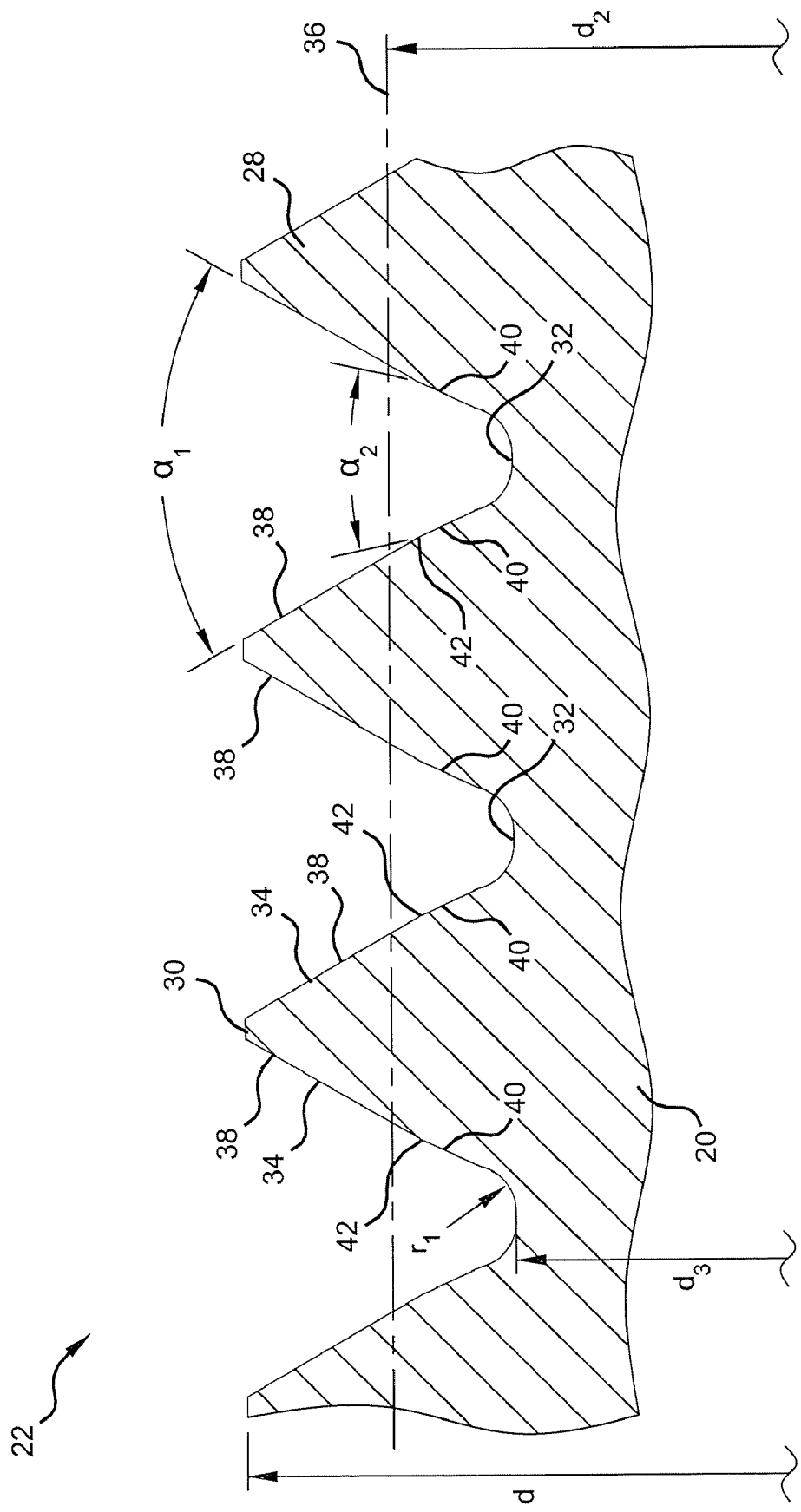
FIG. 2 is an enlarged fragmented cross-sectional view of the bolt of FIG. 1 along line 2-2.

Referring now to FIG. 2, an enlarged fragmented cross-sectional view of a portion of thread form 22 of FIG. 1 is shown. Thread form 22 includes a thread 28 that extends helically along bolt 20. Thread 28 includes a crest 30 and a root 32. Crest 30 defines the major diameter d of bolt 20 while root 32 defines the minor diameter $d_3$ of bolt 20. Thread 28 includes a pair of sides (or flanks) 34 that extend from crest 30 to adjacent roots 32. The pitch diameter $d_2$ of thread form 22 is represented by line 36. The pitch diameter $d_2$ is defined as the diameter of an imaginary cylinder, the surface of which would pass through the threads at such points as to make equal the width of the threads and the width of the spaces cut by the surface of the cylinder. Sides 34 each include a first portion 38 and a second portion 40. In thread form 22, portions 38, 40 of adjacent facing sides 34 each have an included angle α that differ from one another. Specifically, first portions 38 of adjacent sides 34 have a first included angle $α_1$ of a first value while the second portions 40 of adjacent sides 34 have a second included angle $α_2$ of a different, lesser value. For example, angle $α_1$ can be 60° while angle $α_2$ can be 50°. Each side 34 can have a transition point 42 wherein side 34 transitions between first portion 38 and second portion 40. In the example shown, transition point 42 is located at a diameter less than pitch diameter 36 (below pitch diameter line 36 in the orientation shown in FIG. 2). The transition of second portion 40 to root 32 can be rounded with a radius of curvature $r_1$. First and second portions 38, 40 can form an entirety of side 34.

Figure 10:
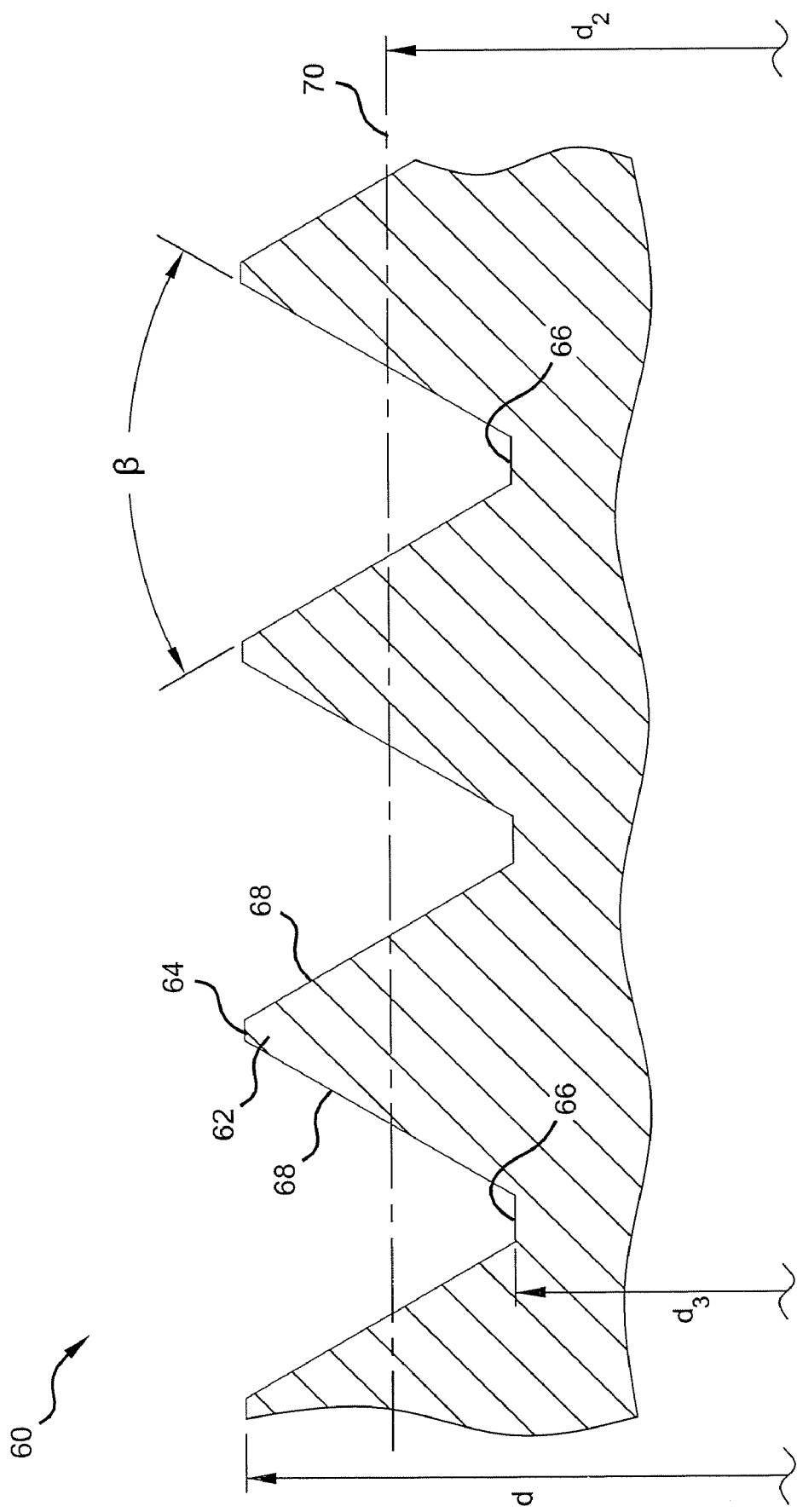
FIG. 10 is an enlarged fragmented cross-sectional view similar to that shown in FIG. 2 showing a portion of a typical prior art thread form.

Referring now to FIG. 10, an enlarged fragmented cross-sectional view of a standard prior art thread form 60 is shown. Thread form 60 includes a thread 62 that extends helically. Thread 62 includes a crest 64, a root 66, and a pair of flanks or sides 68 extending from crest 64 to adjacent roots 66. In the prior art thread form 60, side 68 has an included angle β which is substantially constant from crest 64 to root 66. Typically, angle β is 60°. The sides 68 do not have a transition wherein the included angle β is changed as side 68 extends from crest 64 to root 66. Thread 62 has a pitch diameter represented by line 70. Thread form 60 is shown as being an external thread form such as that which would be used on a bolt or stud (not shown).

In the typical standard thread forms, the contact of the external and internal threads occurs along sides 68 of the two threads between the crests and the roots. The radial depth of engagement, however, does not extend all the way between the crests and roots. Rather, a majority of the contact occurs along sides 68 outward of pitch diameter 70 (above pitch diameter 70 in the orientation depicted in FIG. 10). It should be appreciated that the transition from sides 68 to root 66 in the prior art thread form 60 may be slightly rounded due to specifications, manufacturing techniques, and/or tool wear.

Figure 3:
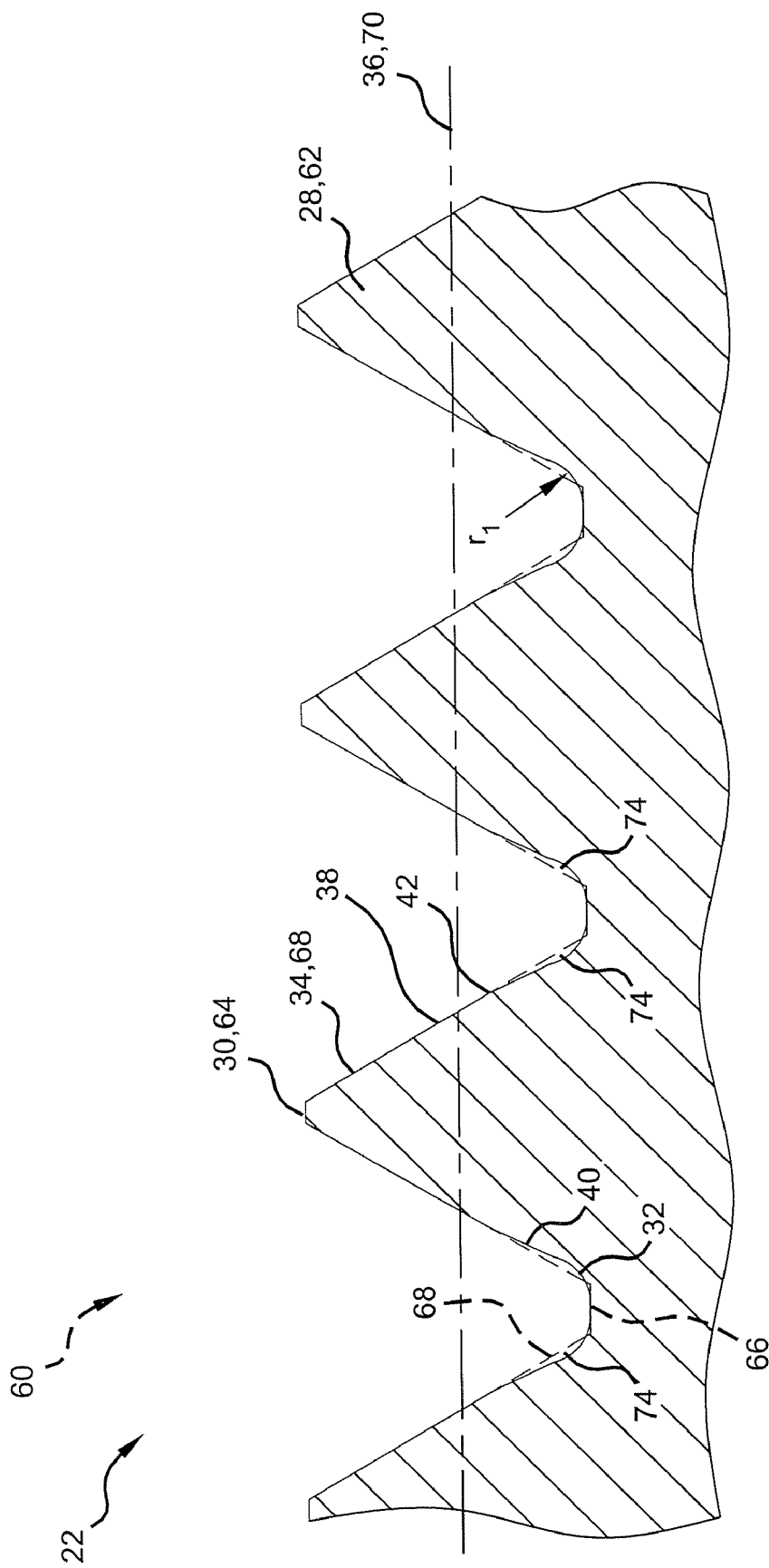
FIG. 3 is a view of FIG. 2 with a standard prior art thread form of FIG. 10 superimposed thereon.

Referring now to FIG. 3, an overlay of prior art thread form 60 onto thread form 22 is shown. Prior art thread form 60 is represented by the dashed line in FIG. 3. As shown, crest 64 of prior art thread form 60 is substantially the same as crest 30 of thread form 22. Root 66 of thread form 60 is substantially aligned with root 32 of thread form 22. Additionally, sides 68 of thread form 60 are substantially the same as first portions 38 of sides 34 of thread form 22. However, second portion 40 of sides 34 of thread form 22 does not align with sides 68 of thread form 60 due to the change in the included angle. The space 74 between sides 68 of thread form 60 and second portion 40 of side 34 of thread form 22 represents the material removed from the standard prior art thread form 60 to form thread form 22. Space 74 can occur within pitch diameter 36, 70 (below in the orientation depicted in FIG. 3). Thus, thread form 22 is substantially similar to thread form 60 above pitch diameter 36 while below pitch diameter 36 it is substantially different with sides 34 changing their included angle $\alpha_2$ at transition point 42. Additionally, when thread form 22 is manufactured, the transition between side 34 and root 32 can have a radius of curvature $r_1$ that is larger than that of thread form 60 (which may have no radius of curvature or a small radius of curvature due to tooling wear).

By limiting the differences between thread form 22 and the standard prior art thread form 60 to changes that occur inside pitch diameter 36, desirable aspects of the standard thread form can be maintained. For example, gages designed for measuring standard prior art thread forms 60 can be used to measure thread form 22 due to the gages engaging with and measuring portions of thread form 22 outside of pitch diameter 36. Additionally, as stated above, a majority of the engagement between thread 62 of standard thread form 60 occurs at and/or outside of pitch diameter 70. As a result, thread form 22 can realize a majority of the engagement between its sides 34 of thread 28 with the sides of a standard internal thread form. It should be appreciated that second portions 40 of sides 34 of thread form 22 may not engage with the sides of the standard thread form due to the change in the included angle $\alpha_2$. As a result, the contact between sides 34 of thread form 22 with the sides of a standard thread form may be limited to the first portion 38.

By adjusting the location of transition point 42, the amount and location of contact between thread 28 of thread form 22 and the thread of a standard thread form can be achieved. As a result, the area of contact can be maintained close to that of a standard thread form. Additionally, the slight change to the area and location of contact can advantageously facilitate the bending of threads 28 of thread form 22 during initial loading in that all of the load is applied further from the root 32 of thread 28.

The removal of material from thread form 22 below transition point 42 can advantageously reduce the stiffness of thread 28 of thread form 22 in its cantilever bending mode under assembled loading. The reduced stiffness of thread 28 of thread form 22 can more evenly distribute loads and is less sensitive to changes in relative pitch. That is, as the differing threaded materials (the engaged male and female threads) deflect, yield, and/or creep, the additional flexibility of threads 28 of thread form 22 can accommodate this relative pitch change while maintaining a more evenly distributed loading between the engaged thread forms. Additionally, when materials having different thermal expansion properties are used for the differing thread forms, the ability of thread 28 of thread form 22 to be more flexible (less stiff) than that of a standard thread form can accommodate the differing thermal expansion properties and maintain a more even distribution of the loading between the engaged thread forms. Thus, the changes in the relative pitch of the engaged thread forms can be more easily accommodated by the more flexible thread 28 of thread form 22 than between prior art standard thread forms which have stiffer characteristics for the same material.

Additionally, thread form 22 can also maintain the core stiffness of bolt 20 by maintaining the dimensions of the minor diameter. As a result, the maintaining of the axial stiffness can avoid increased variation in relative pitch during assembly. The radius of the transition from second portion 40 of side 34 to root 32 can be chosen to maintain or increase the fatigue life of thread form 22 for use in highly loaded applications.

Thus, a bolt 20 having a thread form 22 according to the present teachings can provide improved joint performance. As a result, highly stressed joints can have less clamp load loss when using a bolt having a thread form 22 according to the present teachings. Thread form 22 can substantially maintain the overall axial stiffness of bolt 20 while allowing local accommodation of pitch mismatch by bending of thread 28 of thread form 22 due to its reduced stiffness. This reduced stiffness can enhance the yield, creep, and fatigue performance in highly stressed joints. As a result, thread form 22 is more compliant which can accommodate local pitch mismatches due to manufacturing of the threads, assembly of the threads, and the in-service thermal loads and applied load variations on the threads.

Figure 4:
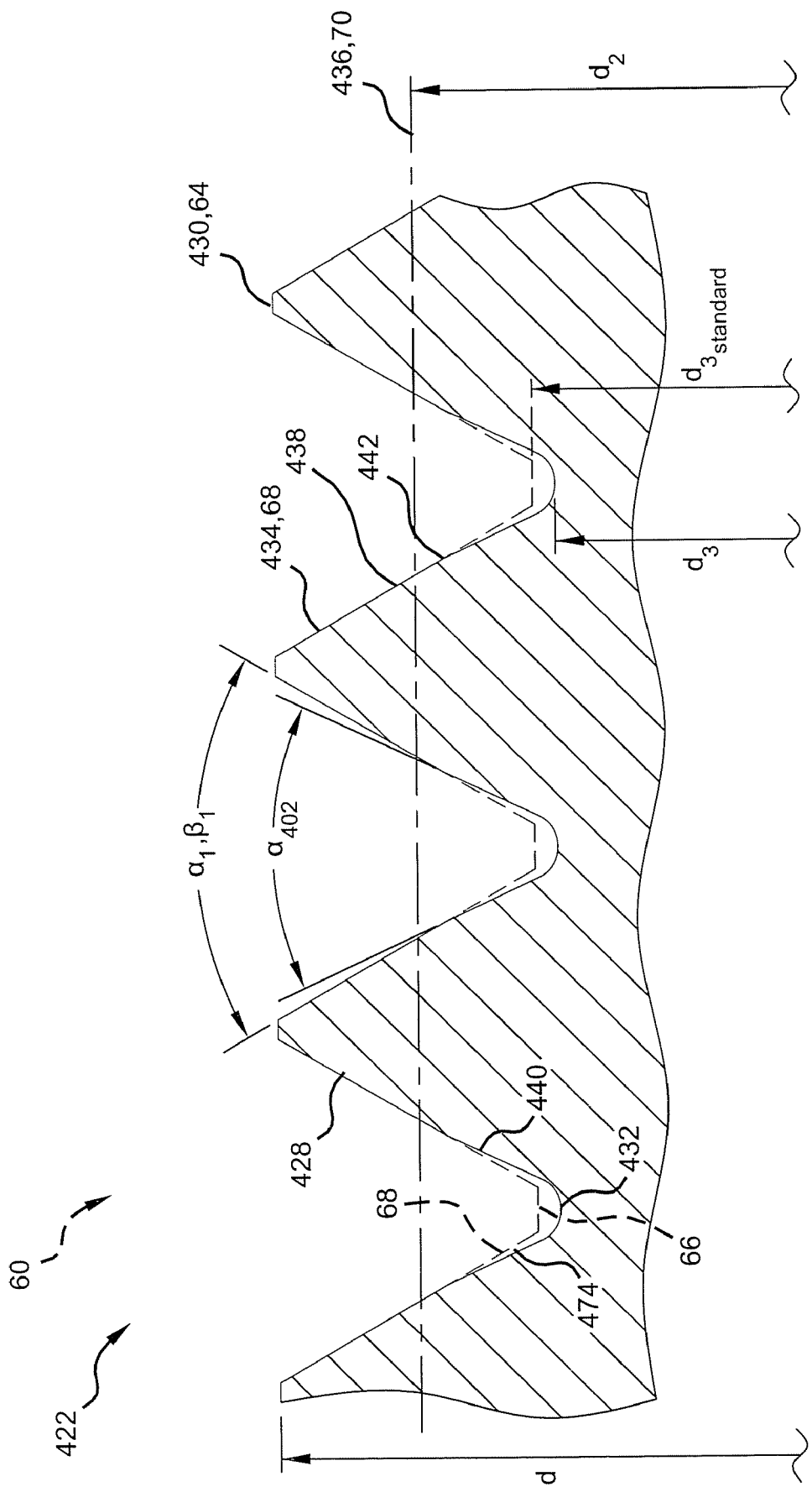
FIG. 4 is an enlarged fragmented cross-sectional view similar to that of FIG. 3 showing a second embodiment of a thread form according to the present teachings with a standard prior art thread form of FIG. 10 superimposed thereon.

Alternatively, as shown in FIG. 4, a second embodiment of a thread form according to the present teachings can have a reduced core stiffness by reducing the dimensions of the minor diameter. In FIG. 4, an overlay of prior art thread form 60 onto a modified thread form 422 is shown. Again, prior art thread form 60 is represented by the dashed line in FIG. 4. As shown, crest 64 of prior art thread form 60 is substantially the same as crest 430 of thread form 422. Root 66 of thread form 60, however, is not aligned with root 432 of thread form 422. Rather, root 432 and the associated minor diameter $d_3$ are substantially reduced (below in the view depicted in FIG. 4) relative to root 66 and the associated minor diameter $d_{3\ standard}$ of thread form 60. Sides 68 of thread form 60 are still substantially the same as first portions 438 of sides 434 of thread form 422. Second portion 440 of sides 434 of thread form 422 again does not align with sides 68 of thread form 60 due to the change in the included angle at transition point 442. The increased depth of root 432 and the change in the included angle result in the space 474 between sides 68 of thread form 60 and second portion 440 of side 434 of thread form 422 being larger than that shown in FIG. 3. Thus, thread form 422 is again substantially similar to thread form 60 above pitch diameter line 436, while below pitch diameter line 436 is substantially different with sides 434 changing their included angle $\alpha_{402}$ at transition point 442.

The deeper root 432 of thread form 422 in conjunction with the removal of material from thread form 422 below transition point 442 can advantageously reduce the stiffness of thread 428 of thread form 422 in its cantilever bending mode under assembled loading. The deeper root 432 reduces the core stiffness of a bolt having thread form 422 by reducing the dimensions of the minor diameter $d_3$. The decreased minor diameter can provide better load loss performance despite reducing the core stiffness. The degree to which the core stiffness of a bolt having thread form 422 is maintained or reduced can be dependent on the needs of a given joint in which thread form 422 is to be used. As a result, thread form 422 allows the ability to independently adjust the root 432 (minor diameter $d_3$) relative to the pitch diameter $d_2$. This independent ability allows a tradeoff to be made between the advantage of a large minor diameter and the advantage of a smaller minor diameter. A smaller minor diameter may have higher initial loading in the first thread at tightening, but will have more compliance thread to thread. As a result, the smaller minor diameter will be less sensitive to changes in thermal stresses when the mating threads are dissimilar or expand at different rates due to their proximity to a source of heat. Accordingly, thread form 422 can change the core stiffness of a bolt by reducing the dimensions of the minor diameter.

Figure 5:
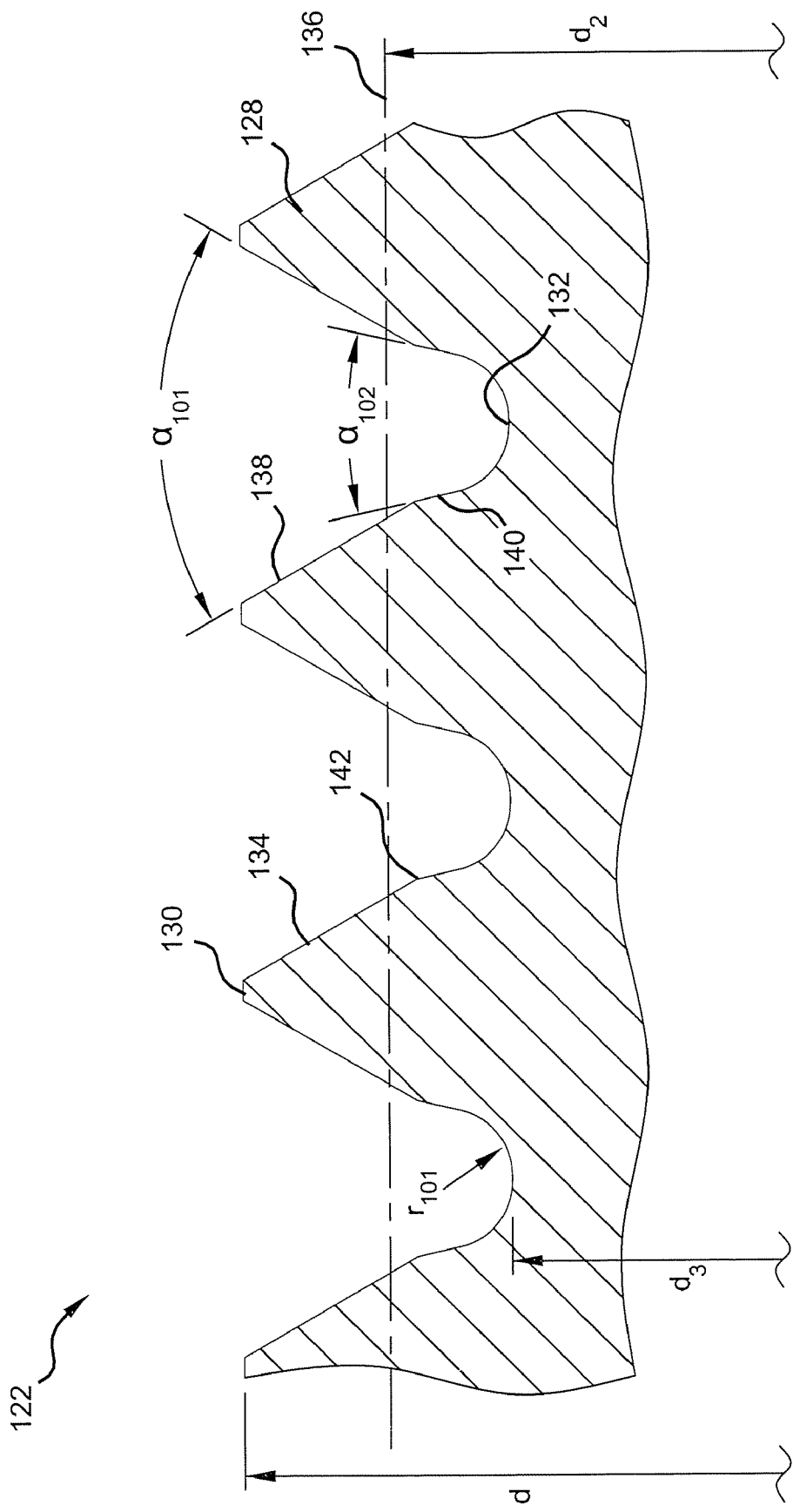
FIG. 5 is an enlarged fragmented cross-sectional view similar to that of FIG. 2 showing a third embodiment of a thread form according to the present teachings.

Referring now to FIG. 5, a third embodiment of a thread form 122 according to the present teachings is shown. Thread form 122 includes a thread 128 with a crest 130, a root 132, and a pair of sides 134 extending therebetween. Crest 130 also represents the major diameter d of thread form 122 while root 132 represents the minor diameter $d_3$ of thread form 122. The pitch diameter $d_2$ of thread form 122 is represented by line 136. Side 134 includes first and second portions 138, 140 that have differing included angles $\alpha_{101}$, $\alpha_{102}$ that change at transition point 142. Included angle $\alpha_{101}$ is greater than included angle $\alpha_{102}$. For example, in FIG. 5, included angle $\alpha_{101}$ can be 60° while included angle $\alpha_{102}$ can be 25°. Transition point 142 can be within (below in the orientation depicted in FIG. 5) pitch diameter 136. Additionally, the radius of transition from second portion 140 of side 134 to root 132 can have a value $r_{101}$ that is greater than $r_1$ of thread form 22. Radius of curvature $r_{101}$ can be selected to achieve a desired fatigue resistance for a bolt incorporating a thread form 122. As a result, thread form 122 can have the same or similar advantages to those described above with reference to thread form 22 in that the sides 134 include first and second portions 138, 140 with differing included angles $\alpha_{101}$, $\alpha_{102}$ such that a stiffness of thread 128 can be reduced over a thread having a standard thread form.

Figure 6:
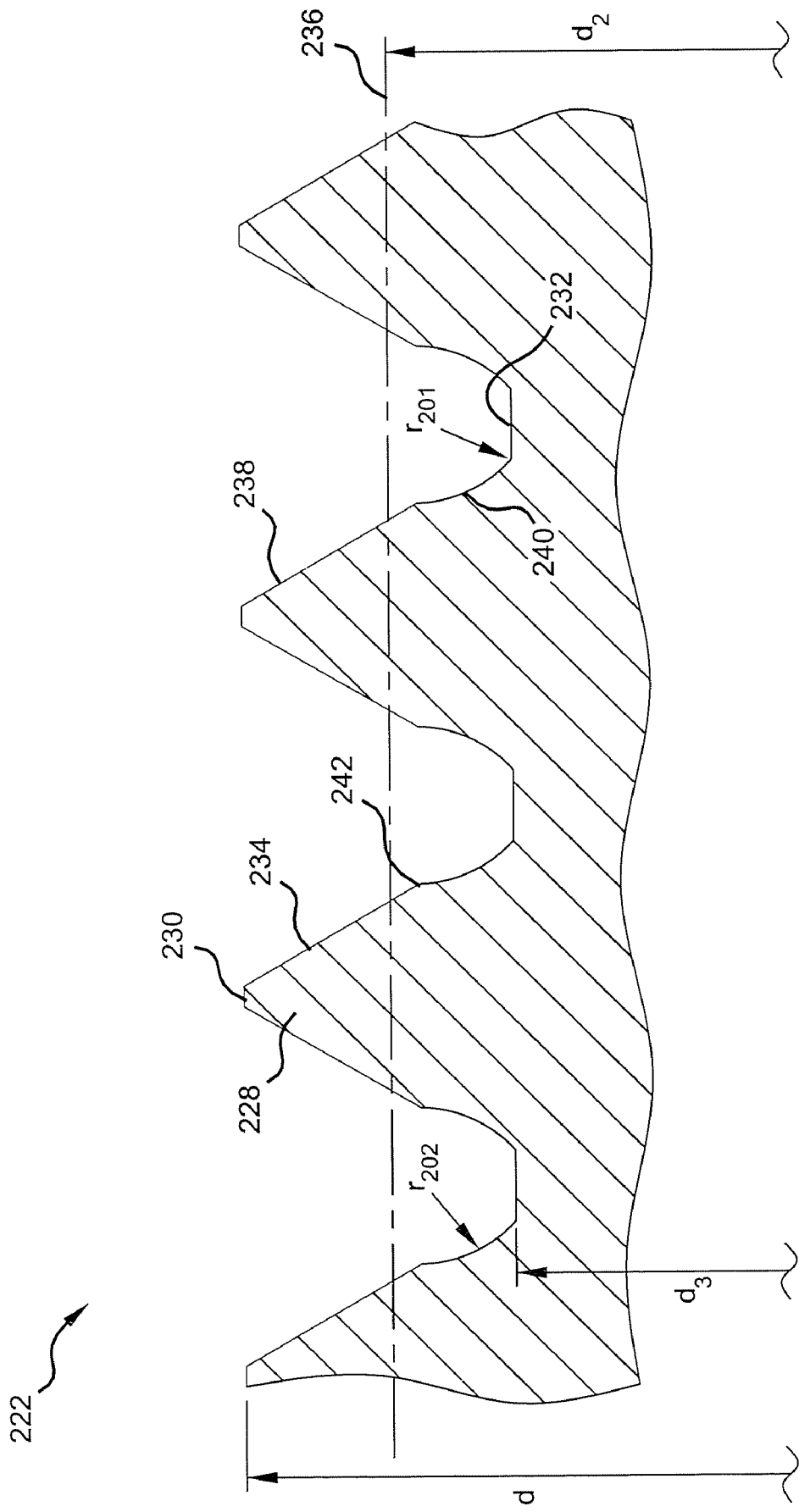
FIG. 6 is an enlarged fragmented cross-sectional view similar to that of FIG. 2 showing a fourth embodiment of a thread form according to the present teachings.

Referring now to FIG. 6, a fourth embodiment of a thread form 222 according to the present teachings is shown. Thread form 222 is similar to thread form 22 and has a thread 228 with a crest 230, a root 232, and a pair of sides 234 extending therebetween. Crest 230 also represents the major diameter d of thread form 222 while root 232 represents the minor diameter $d_3$ of thread form 222. The pitch diameter $d_2$ of thread form 222 is represented by line 236. Again, side 234 includes a first portion 238 and a second portion 240 whose relative shapes change at transition point 242. Second portion 240 in thread form 222 in axial cross-section does not extend linearly, as done in thread forms 22 and 122. Rather, second portion 240 in axial cross-section is a curved surface with a radius of curvature $r_{202}$ which also results in thread 228 having a lower stiffness than a thread formed from a standard prior art thread form 60. Again, transition point 242 can be located within (below in the orientation depicted in FIG. 6) pitch diameter 236. Second portion 240 can transition into root 232 such that the transition has a radius of curvature $r_{201}$. It should be appreciated, however, that the transition of second portion 240 into root 232 can have a different radius of curvature $r_{201}$ greater or less than that of radius of curvature $r_{202}$. Thread form 222 provides some of the same and/or similar advantages discussed above with reference to thread form 22 in that second portion 240 changes orientation relative to first portion 238 thereby providing thread 228 with a controlled stiffness that is less than that of a thread 62 of a standard thread form 60. As a result of the greater flexibility of thread 228, a more compliant thread form 222 is achieved with the advantages discussed above.

Figure 7:
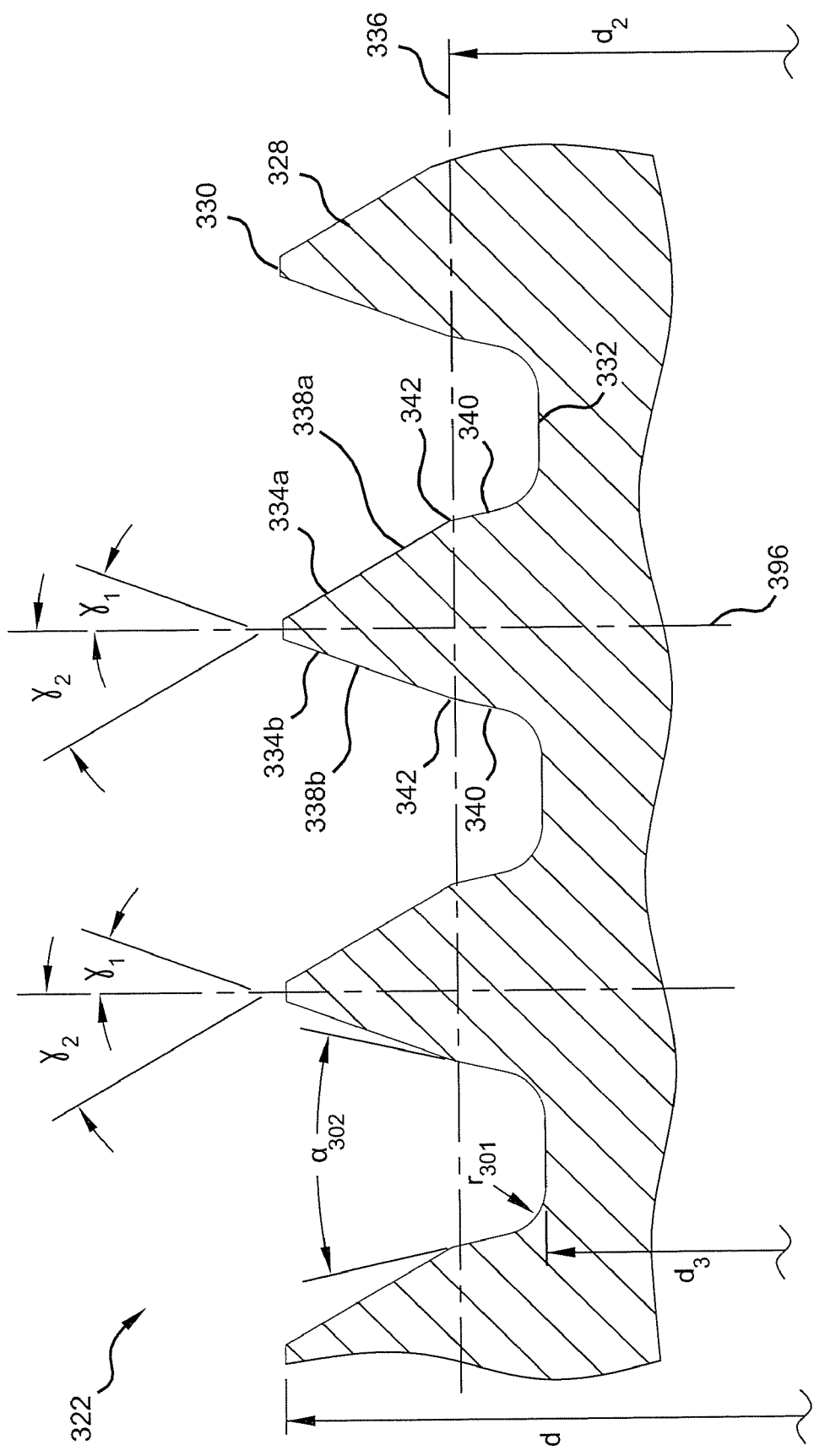
FIG. 7 is an enlarged fragmented cross-sectional view similar to that of FIG. 2 showing a fifth embodiment of a thread form according to the present teachings.

Referring now to FIG. 7, a fifth embodiment of a thread form 322 according to the present teachings is shown. Thread form 322 is similar to thread form 22 and has a thread 328 with a crest 330, a root 332, and a pair of sides 334 extending therebetween. Crest 330 also represents the major diameter d of thread form 322, while root 332 represents the minor diameter $d_3$ of thread form 322. The pitch diameter $d_2$ of thread form 322 is represented by line 336. Again, each side 334 includes a first portion 338 and a second portion 340 whose relative shapes change at transition point 342. In thread form 322, however, the first portions of sides 334 extending from the same crest 330 are not symmetrical as they extend toward adjacent roots 332. Rather, first portion 338a of a first side 334a extends from a crest 330 toward a root 332 at flank angle $\gamma_1$ of a first value while a first portion 338b of a second side 334b extends from the same crest 330 toward an adjacent root 332 at a flank angle $\gamma_2$ of a second value different from the first value. As a result, first portions 338a, 338b are asymmetric relative to a radial line 396 which extends perpendicular to the pitch diameter 336 through the center of the same crest 330. The flank angle $\gamma$ is defined as the angle between the flank and the radial line which extends perpendicular to the pitch diameter through the center of the associated crest. Thus, the flank angle in the case of symmetrical threads would be the same as one half of the included angle. Flank angles $\gamma_1$, $\gamma_2$ can have a variety of values. For example, flank angle $\gamma_1$ can be 20° while flank angle $\gamma_2$ can be 30°, by way of non-limiting example.

In contrast to the asymmetric nature of first portions 338a, 338b, second portions 340 of sides 334 can be symmetric and extend from transition point 342 to root 332 with an included angle $\alpha_{302}$. Included angle $\alpha_{302}$ can have a variety of values. For example, included angle $\alpha_{302}$ can be 50° by way of non-limiting example. In some embodiments, second portions 340 of sides 334 may be asymmetric.

Transition point 342 can be located within (below in the view depicted in FIG. 7) pitch diameter 336. Second portion 340 can transition into root 332 such that the transition has a radius of curvature $r_{301}$. Thread form 322 provides some of the same and/or similar advantages discussed above with reference to thread form 22 in that second portion 340 changes orientation relative to first portion 338, thereby providing thread 328 with a controlled stiffness that can be less than that of a thread 62 of a standard thread form 60. Additionally, the asymmetric features of the first portions 338a, 338b of sides 334a, 334b allow a weakening of the bending stiffness of thread 328 without changing the core stiffness of a bolt having thread form 322 thereon and can provide further control and reduction in the stiffness. As a result of the greater flexibility of thread 328, a more compliant thread form 322 can be achieved.

Figure 8:
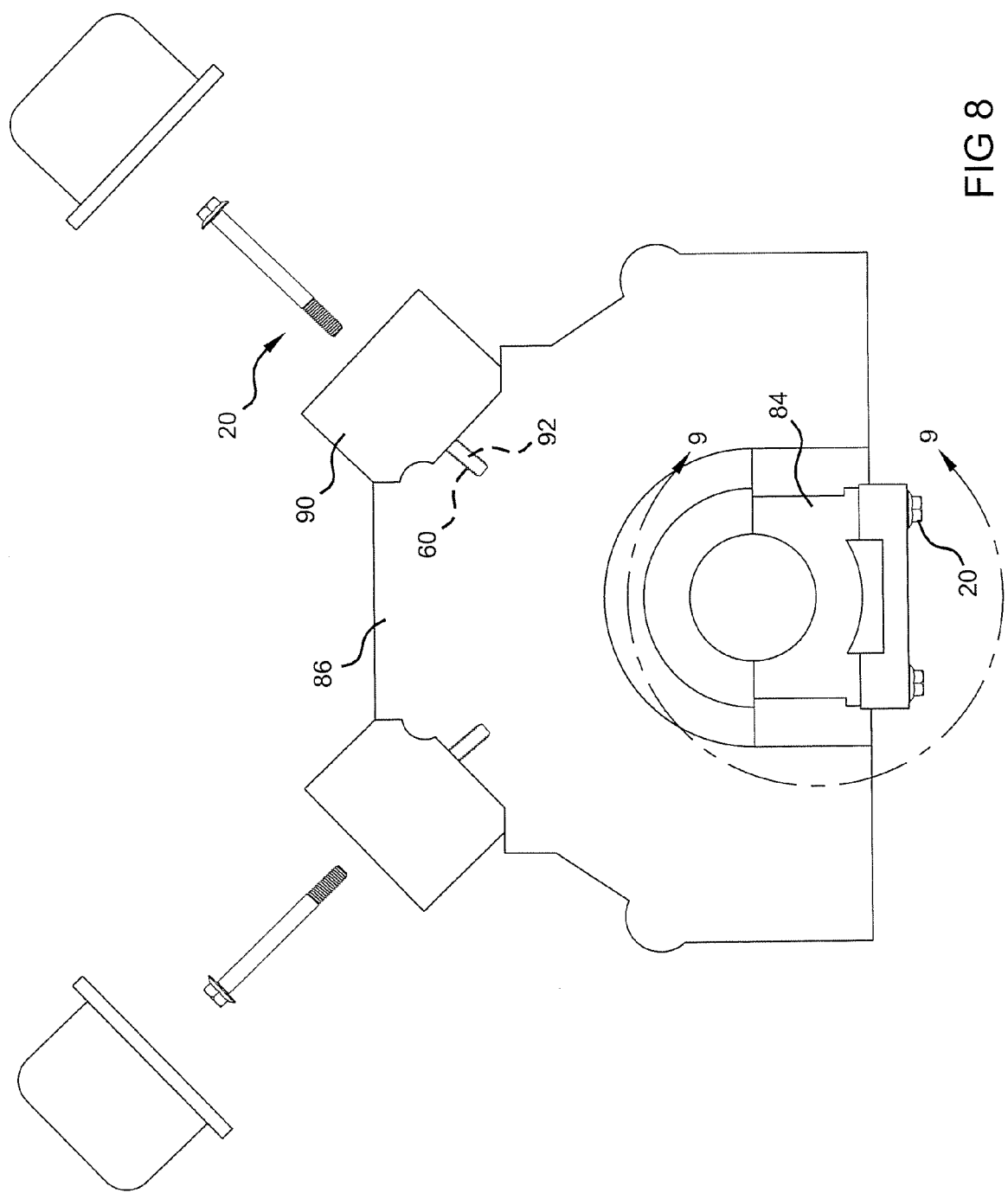
FIG. 8 is a schematic representation of an engine block showing the use of a fastener having a thread form according to the present teachings used to retain a cylinder head thereto and also showing the use of a fastener having a thread form according to the present teachings retaining a bearing cap for a crankshaft.
Figure 9:
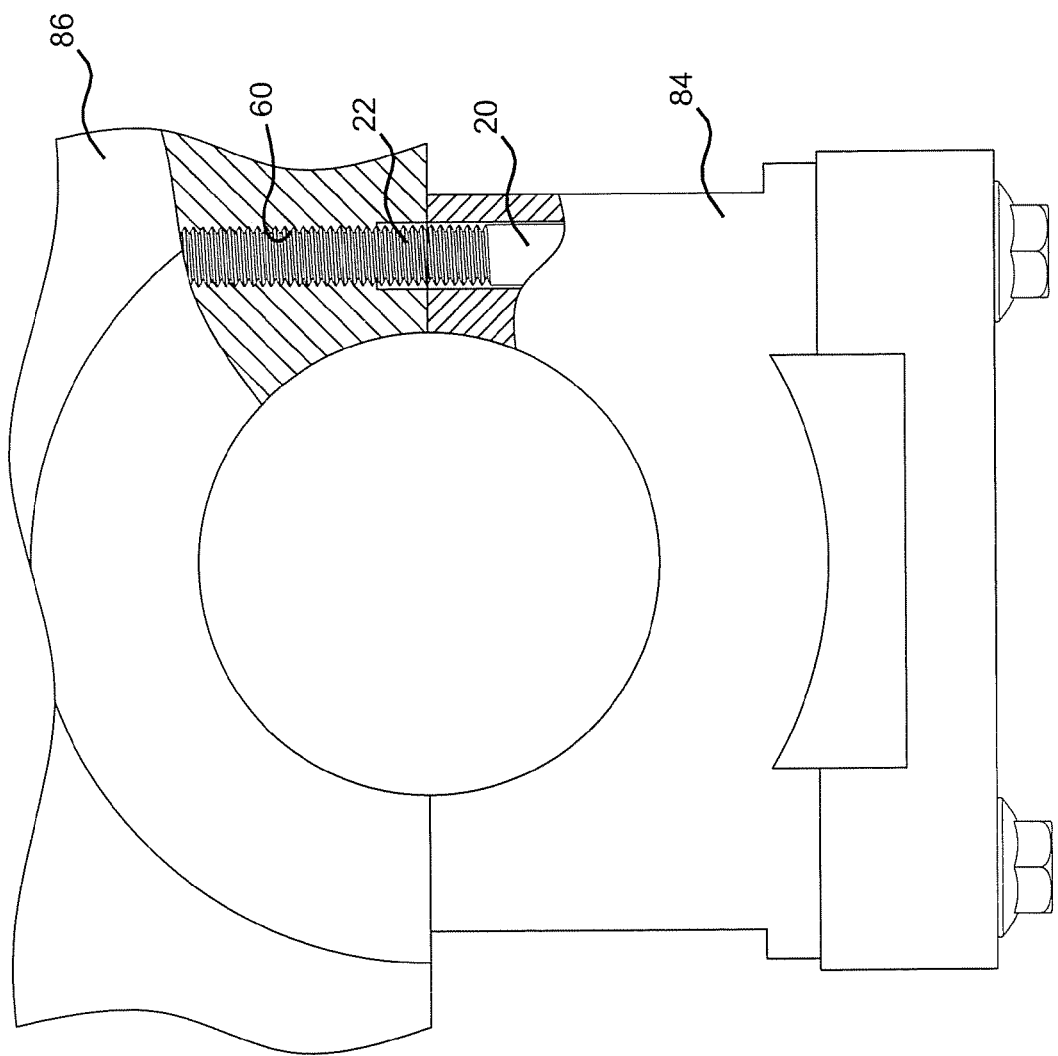
FIG. 9 is an enlarged fragmented partial cross-sectional view of a portion of the engine of FIG. 8 within circle 9-9.

The thread forms 22, 122, 222, 322, 422 according to the present teachings can be used in a number of applications. These thread forms are particularly applicable to highly loaded joints. For example, as shown in FIGS. 8 and 9, a bolt 20 having a thread form 22 thereon can be used to retain a crankshaft bearing cap 84 to an engine block 86. Engine block 86 and bolt 20 can be made of different materials, such as an aluminum engine block and a steel bolt by way of non-limiting example. The two different metals have differing thermal coefficients of expansion and, as a result, the thread forms of the present teachings can advantageously be used on bolt 20 to provide a more compliant joint that is less susceptible to deflection, yield, creep and/or failure due to the differing thermal expansion rates during operation. As shown in FIG. 8, engine block 86 can have an internal thread form 60 which is a standard internal thread form while bolt 20 can have thread form 22 according to the present teachings.

Another exemplary application within which a bolt 20 having a thread form 22, 122, 222, 322, 422 according to the present teachings can be advantageously employed includes the securing of a cylinder head 90 to engine block 86. Engine block 86 can have one or more internally threaded bores 92 with a standard prior art internal thread form 60. Again, engine block 86 and bolt 20 can be differing materials, such as aluminum and steel, respectively, by way of non-limiting example. The use of a bolt 20 having a thread form according to the present teachings can advantageously provide a more compliant joint that can accommodate the differing thermal expansion rates of the engine block 86 and bolt 20, thereby better retaining the clamp load over its service life.

Another advantage of using a bolt 20 having a thread form 22, 122, 222, 322, 422 according to the present teachings is that the bolt can be advantageously retrofitted into an existing threaded member having a typical prior art internal thread form. Specifically, a bolt having a standard thread form and engaged with a standard internal threaded member can be removed therefrom and replaced with a bolt 20 having a thread form according to the present teachings. The replacement bolt utilizing the thread forms of the present teachings, as stated above, can engage with and be used with the threaded member having the standard thread form. This capability allows for the joint formed therebetween to be more compliant by realizing a controlled stiffness of the threads of the thread form according to the present teachings. In this manner, an improvement in a compliance of an existing joint can be realized. This can be done without requiring modification of the threads of the threaded member into which the bolt having a thread form according to the present teachings is to be engaged. Thus, two different thread forms, a thread form according to the present teachings and a typical prior art thread form, can be utilized together to realize an improved compliance of the joint formed therebetween by retrofitting a bolt having a prior art thread form with one having a thread form according to the present teachings.

While the present teachings have been described with reference to specific examples and illustrations, it should be appreciated that these examples and illustrations are merely exemplary in nature and that deviations and changes from the configurations shown can be employed and are still within the scope of the present teachings. For example, the specific included angles and flank angles can vary from those shown and discussed. Additionally, the radius of curvature $r_{202}$ of second portion 240 of thread form 222 can also vary from that shown. Additionally, the location of transition points 42, 142, 242, 342, 442 relative to the associated pitch diameter 36, 136, 236, 336, 436 can also vary from that shown. It should be appreciated, however, that if the transition point occurs above the associated pitch diameter, all the advantages of the thread forms of the present teachings may not be realized. Furthermore, it should be appreciated that transition points 42, 142, 242, 342, 442 can be smooth and/or rounded due to manufacturing process, to control stress concentrations, or for other considerations. Additionally, it should also be appreciated that the minor diameter of a thread form according to the present teachings can vary from that of a standard thread form. Moreover, while the present thread form is shown as used on a bolt as an external thread form, it should be appreciated that the thread form can also be used as an internal thread form such as in a nut or in a threaded bore. Furthermore, while the present thread form is shown as used on a bolt, the thread form can be used on other components having an external thread form, such as a stud and the like. Additionally, it should be appreciated that the present thread forms can be formed and used as left or right-handed threads. Moreover, it should also be appreciated that while the thread form according to the present teachings is shown and discussed as engaging with a standard prior art thread form, two complementary thread forms according to the present teachings can engage with one another (as external and internal threads) to clamp a highly loaded joint. Furthermore, while the first and second portions of the side of the thread form according to the present teachings are shown as extending toward the root in different orientations relative to the thread, it should be appreciated that these orientations are merely exemplary and that deviations and changes in these orientations can also be utilized. Accordingly, such changes in deviation should be considered as being within the scope of the present teachings.

What is claimed is:

1. A joined assembly comprising:
   a first member having a first aperture extending therethrough;
   a second member having a second aperture; and
   a bolt extending through said first aperture and at least partially into said second aperture, said bolt having a helically extending external thread thereon, said bolt axially loading said first and second members and retaining said first and second members together, and said thread including:
   a crest;
   a root; and
   first and second sides opposite one another extending between said crest and said root, each of said first and second sides having a first portion extending from said crest toward said root and a second portion extending from said first portion toward said root, said first and second portions extending toward said root in different orientations relative to said thread,
   wherein said first portion of said first side has a flank angle of a first value and said first portion of said second side has a flank angle of a second value less than said first value, each of said first portions extending from outside of a pitch diameter of said thread to inside said pitch diameter.

2. The joined assembly of claim 1, wherein said second aperture includes an internal thread that engages with said bolt thread to axially load said first and second members and retain said first and second members together.

3. The joined assembly of claim 2, wherein said bolt is a first material and said second member internal thread is a second material different than said first material.

4. The joined assembly of claim 3, wherein said first material is steel and said second material is aluminum.

5. The joined assembly of claim 1, wherein said first portion extends toward said root at a first included angle, said second portion extends toward said root at a second included angle, and said second included angle is less than said first included angle.

6. The joined assembly of claim 1, wherein said first and second portions comprise an entirety of said side.

7. The joined assembly of claim 1, wherein in axial cross-section, said first portion extends linearly toward said root and said second portion curves toward said root.

8. The joined assembly of claim 1, wherein said second aperture includes an internal thread that engages with said bolt thread to axially load said first and second members and retain said first and second members together.

9. The joined assembly of claim 8, wherein said bolt is a first material and said second member internal thread is a second material different than said first material.

10. The joined assembly of claim 9, wherein said first material is steel and said second material is aluminum.

11. The joined assembly of claim 8, wherein said external thread has a first thread pitch, said internal thread has a second thread pitch, and said first thread pitch is substantially the same as said second thread pitch.

12. The joined assembly of claim 1, wherein said first member is one of a cylinder head and a crank shaft bearing cap and said second member is an engine block.

13. The joined assembly of claim 1, wherein in axial cross-section, said first portions of said first and second sides extend linearly toward said root.

14. A joined assembly comprising:
- a first member having a first aperture extending therethrough;
- a second member having a second aperture; and
- a bolt extending through said first aperture and at least partially into said second aperture, said bolt having a helically extending external thread thereon, said bolt axially loading said first and second members and retaining said first and second members together, and said thread including:
  - a crest;
  - a root; and
  - first and second sides opposite one another extending between said crest and said root, each of said first and second sides having a first portion extending from said crest toward said root and a second portion extending from said first portion toward said root, said first and second portions extending toward said root in different orientations relative to said thread,
- wherein in axial cross-section, said first portions extend linearly toward said root and said second portions curve toward said root, said first portion of said first side has a flank angle of a first value and said first portion of said second side has a flank angle of a second value less than said first value.

15. The joined assembly of claim 14, wherein said first member is one of a cylinder head and a crank shaft bearing cap and said second member is an engine block.

* * * * *